United States Patent
Park

(10) Patent No.: US 8,730,414 B2
(45) Date of Patent: May 20, 2014

(54) LIQUID CRYSTAL DISPLAY DEVICE INCLUDING VARIOUS EMBODIMENTS OF LIGHT-SHIELDING LINE

(75) Inventor: JaeHoon Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 7 days.

(21) Appl. No.: 13/212,472

(22) Filed: Aug. 18, 2011

(65) Prior Publication Data

US 2012/0050660 A1 Mar. 1, 2012

(30) Foreign Application Priority Data

Aug. 30, 2010 (KR) .......... 10-2010-0083878

(51) Int. Cl.
*G02F 1/1335* (2006.01)
(52) U.S. Cl.
USPC .......................... 349/12; 349/111
(58) Field of Classification Search
USPC ............. 349/141, 129–130, 110, 111, 12
See application file for complete search history.

(56) References Cited

U.S. PATENT DOCUMENTS

| | | | |
|---|---|---|---|
| 6,559,913 B1 * | 5/2003 | Sera | 349/111 |
| 2004/0183989 A1 * | 9/2004 | Kim et al. | 349/155 |
| 2004/0252266 A1 * | 12/2004 | Shimizu et al. | 349/139 |
| 2005/0162590 A1 * | 7/2005 | Ozawa et al. | 349/110 |
| 2005/0237472 A1 * | 10/2005 | Shibahara et al. | 349/167 |
| 2006/0114391 A1 * | 6/2006 | Seo et al. | 349/129 |
| 2007/0064191 A1 * | 3/2007 | Shin et al. | 349/144 |
| 2010/0033448 A1 * | 2/2010 | Koito et al. | 345/174 |
| 2011/0242444 A1 * | 10/2011 | Song | 349/43 |

* cited by examiner

*Primary Examiner* — Michael Caley
*Assistant Examiner* — Kendrick Hsu
(74) *Attorney, Agent, or Firm* — Morgan, Lewis & Bockius LLP

(57) ABSTRACT

Disclosed is an LCD device which facilitates to prevent light leakage by forming a light-shielding line in a disclination-occurring portion of a pixel region, that is, a portion along the interface between divided domains in the pixel region, wherein the LCD device comprises gate and data lines which are formed on a substrate while intersecting each other to define a pixel region; a pixel electrode which is formed in the pixel region, and is divided into at least two domains; a common electrode which is patterned to generate an electric field together with the pixel electrode; and a light-shielding line which is formed in the interfacial portion between the domains so as to prevent light leakage therethrough.

10 Claims, 12 Drawing Sheets

LIQUID CRYSTAL DISPLAY DEVICE INCLUDING VARIOUS EMBODIMENTS OF LIGHT-SHIELDING LINE

CROSS REFERENCE TO RELATED APPLICATIONS

This application claims the benefit of the Korean Patent Application No. 10-2010-0083878 filed on Aug. 30, 2010, which is hereby incorporated by reference as if fully set forth herein.

BACKGROUND OF THE INVENTION

1. Field of the Invention

The present invention relates to a liquid crystal display (LCD) device, and more particularly, to an LCD device with wide viewing angle and good picture quality.

2. Discussion of the Related Art

A liquid crystal display (LCD) device is widely applied in various fields, for example, notebook computer, monitor, spacecraft, and aircraft, owing to advantageous properties such as low driving voltage, low power consumption, and portability.

The LCD device includes a lower substrate, an upper substrate, and a liquid crystal layer formed between the lower and upper substrates. According to whether or not an electric field is applied, an alignment of the liquid crystal layer is controlled so that light transmittance is controlled in the LCD device, to thereby display images on the LCD device.

There have been proposed various methods for improving a viewing angle property in the LCD device. Among the above various methods, there is a method to divide a pixel region into two domains. Hereinafter, a related art method for improving the viewing angle property will be described with reference to the accompanying drawings.

FIG. 1 is a plane view illustrating a lower substrate of an LCD device according to the related art.

As shown in FIG. 1, the lower substrate of the LCD device according to the related art includes a substrate 10, a gate line 20, a data line 30, and a pixel electrode 50.

The gate line 20 is formed in a horizontal direction, and the data line 30 is formed in a vertical direction. A plurality of pixel regions are defined by the gate line 20 and the data line 30.

The pixel electrode 50 is formed in each of the pixel regions. As an electric field is formed between the pixel electrode 50 and a common electrode (not shown), liquid crystal is driven.

In case of the related art LCD device, the data line 30 is provided in a line shape with bent portions so the pixel electrode 50 is also bent. Thus, one pixel region may be divided into two domains, whereby liquid crystal is driven differently in each domain, thereby resulting in uniform light transmittance in accordance with a viewing angle direction.

However, even though the related art LCD device improves the viewing angle property, a disclination occurs in the bent portion of the pixel electrode 50 along the line of I-I, thereby resulting in deterioration of picture quality.

SUMMARY OF THE INVENTION

Accordingly, the present invention is directed to an LCD device that substantially obviates one or more problems due to limitations and disadvantages of the related art.

An aspect of the present invention is to provide an LCD device with wide viewing angle and good picture quality.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device comprising: gate and data lines which are formed on a substrate while intersecting each other to define a pixel region; a pixel electrode which is formed in the pixel region, and is divided into at least two domains; a common electrode which is patterned to generate an electric field together with the pixel electrode; and a light-shielding line which is formed in the interfacial portion between the domains so as to prevent light leakage therethrough.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
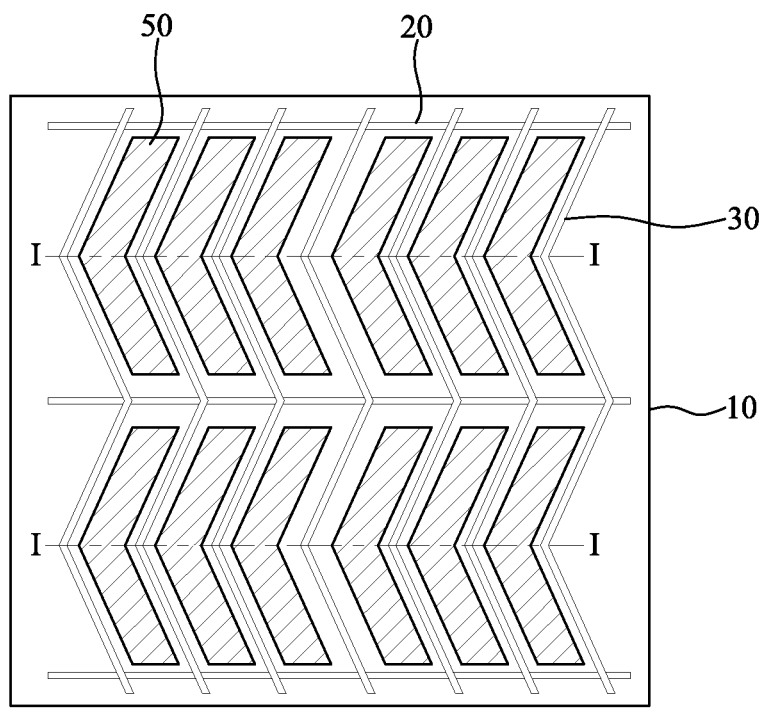
FIG. 1 is a plane view illustrating a lower substrate of a related art LCD device.
Figure 2A:
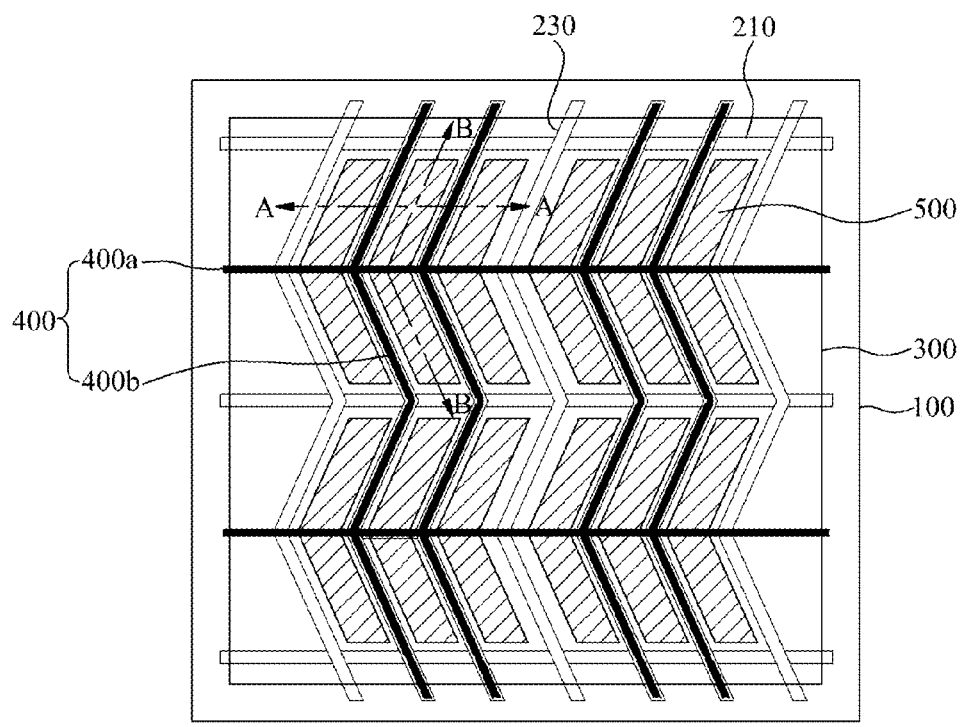
FIG. 2A is a plane view illustrating a lower substrate of an LCD device according to one embodiment of the present invention.
Figure 2B:
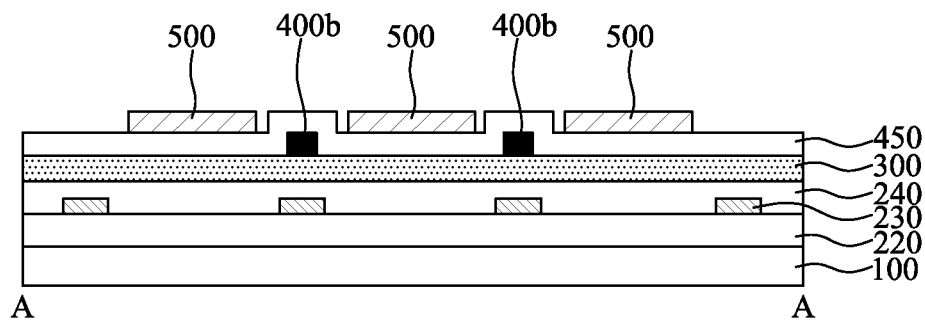
FIG. 2B is a cross section view along A-A of FIG. 2A.
Figure 2C:
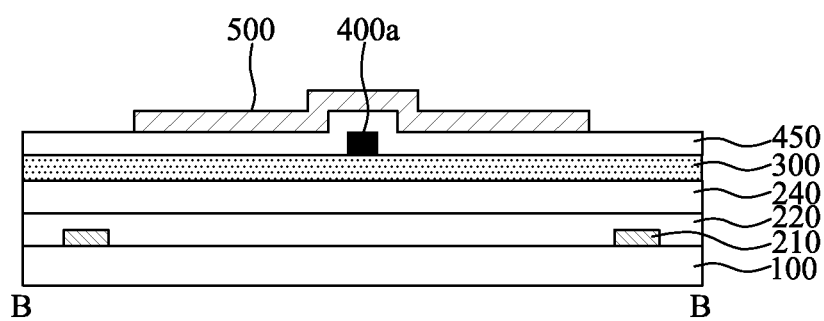
FIG. 2C is a cross section view along B-B of FIG. 2A.

FIG. 2A is a plane view illustrating a lower substrate of an LCD device according to one embodiment of the present invention, FIG. 2B is a cross section view along A-A of FIG. 2A, and FIG. 2C is a cross section view along B-B of FIG. 2A.

FIGS. 2A to 2C illustrate only main structures related with the present invention, and omit other structures except the main structures.

As shown in FIG. 2A, the LCD device according to one embodiment of the present invention includes a substrate 100, a gate line 210, a data line 230, a common electrode 300, a light-shielding line 400, and a pixel electrode 500.

The substrate 100 may be formed of glass or transparent plastic.

The gate line 210 is formed in a horizontal direction on the substrate 100, and the data lines 230 is formed in a vertical direction on the substrate 100. Thus, a plurality of pixel regions are defined by the gate and data lines 210 and 230 intersecting each other.

The gate line 210 is formed in a straight line shape, and the data line 230 is formed in a line shape with a bent portion. Thus, the pixel region defined by interesting the gate line 210 and the data line 230 each other may be provided with a bent portion, that is, the pixel region may be divided into two domains, thereby resulting in improvement of viewing angle.

In the accompanying drawings, the data line 230 is provided with one bent portion within one pixel region, whereby one pixel region is divided into the two domains, but it is not limited to the two domains. The data line 230 may be provided with two or more bent portions within one pixel region, whereby one pixel region may be divided into three or more domains.

Although not shown, a thin film transistor is formed as a switching device for each of the pixel regions. The thin film transistor includes a gate electrode, a semiconductor layer, and source/drain electrodes. The thin film transistor may be formed in a bottom gate structure in which the gate electrode is positioned under the semiconductor layer, or a top gate structure in which the gate electrode is positioned above the semiconductor layer.

The common electrode 300 is formed over the substrate 100. The common electrode 300 together with the pixel electrode 500 generates an electric field so as to drive liquid crystal. Also, the common electrode 300 is formed to cover the plurality of pixel regions. One common electrode 300 can be formed over the substrate 100 while covering the entire area including the plurality of pixel regions on the substrate 100.

The light-shielding line 400 is formed in a disclination-occurring portion of the pixel region, that is, a portion along the interface between the two domains in the pixel region. In more detail, the light-shielding line 400 is formed in the bent portion of the pixel electrode 500, thereby preventing light leakage.

The light-shielding line 400 prevents light leakage, and reduces resistance of the common electrode 300.

Generally, the common electrode 300 is formed of a transparent conductive material such as Indium-Tin-Oxide (ITO). The transparent conductive material is disadvantageous in that it has large electric resistance. Thus, the common electrode 300 is connected with the light-shielding line 400, thereby resulting in the reduced resistance of the common electrode 300. For this, the light-shielding line 400 may be formed of a conductive line using a metal material with good conductivity.

In order that the light-shielding line 400 performs the above functions of preventing the light leakage and reducing the resistance of the common electrode 300, the light-shielding line 400 includes a first light-shielding line 400a and a second light-shielding line 400b, wherein the first light-shielding line 400a is formed in the interfacial portion between the divided domains, that is, the bent portion of the pixel electrode 500; and the second light-shielding line 400b intersects the first light-shielding line 400a. At this time, the first light-shielding line 400a may be arranged in parallel to the gate line 210.

In order to reduce the resistance of the common electrode 300, the second light-shielding line 400b may be additionally formed in a predetermined area irrelevant to a light leakage occurring area. Preferably, the second light-shielding line 400b overlaps with the data line 230 so as to prevent the decrease in transmittance by the additionally-provided second light-shielding line 400b. In addition, a width of the second light-shielding line 400b is not larger than a width of the data line 230 so as to prevent the decrease in light transmittance, preferably. As shown in the drawings, the second light-shielding line 400b may overlap only with a predetermined portion of the data line 230, or may overlap with entire portions of the data line 230. That is, the number and position of the second light-shielding lines 400b to be provided may be changeable appropriately.

In order to reduce the resistance of the common electrode 300 together with not causing the decrease of transmittance, a light-shielding line of a conductive line may be additionally provided while being overlapped with the gate line 210.

The pixel electrode 500 is formed in each of the pixel regions. Thus, the pixel electrode 500, which is provided in accordance with the bent shape of each pixel region, is divided into at least two domains.

Although not shown, a slit may be provided inside the pixel electrode 500. In this case, the pixel electrode 500 may be formed in a finger shape. If the pixel electrode 500 is formed in the finger shape, a fringe field is generated between the pixel electrode 500 and the plate-shaped common electrode 300, whereby liquid crystal is driven by the fringe field. That is, it is possible to realize a fringe field switching mode LCD device.

A cross section structure of the LCD device according to one embodiment of the present invention will be described with reference to FIGS. 2B and 2C. As shown in FIG. 2B, a gate insulating film 220 is formed on the substrate 100, and the data lines 230 are formed at fixed intervals on the gate insulating film 220. Then, a passivation film 240 is formed on the data line 230, and the common electrode 300 is formed on the passivation film 240. On the common electrode 300, there is the light-shielding line, and more particularly, the second light-shielding line 400b. Then, an insulating film 450 is formed on the second light-shielding line 400b, and the pixel electrode 500 is formed on the insulating film 450. Especially, the second light-shielding line 400b overlaps with the data line 230.

As shown in FIG. 2C, the gate lines 210 are formed at fixed intervals on the substrate 100. On the gate line 210, there is the gate insulating film 220. Then, the passivation film 240 is formed on the gate insulating film 220, and the common electrode 300 is formed on the passivation film 240. The light-shielding line, and more particularly, the first light-shielding line 400a is formed on the common electrode 300, and the insulating film 450 is formed on the first light-shielding line 400a. Then, the pixel electrode 500 is formed on the insulating film 450.

The accompanying drawings show that the light-shielding line 400a, 400b directly contacts with the common electrode 300 while being positioned on an upper surface of the common electrode 300, but it is not limited to this structure. If needed, the light-shielding line 400a, 400b may directly contact with the common electrode 300 while being positioned on a lower surface of the common electrode 300.

The LCD device according to the present invention prevents the light leakage by the use of light-shielding line 400, and also reduces the resistance of the common electrode 300 by connecting the light-shielding line 400 of the conductive line with the common electrode 300. However, due to step difference by the light-shielding line 400, an alignment defect may occur for a rubbing process of an alignment film. The alignment defect might cause difficulties in adjusting the driving of liquid crystal, thereby resulting in the light leakage. This will be explained in detail as follows.

Figure 3A:
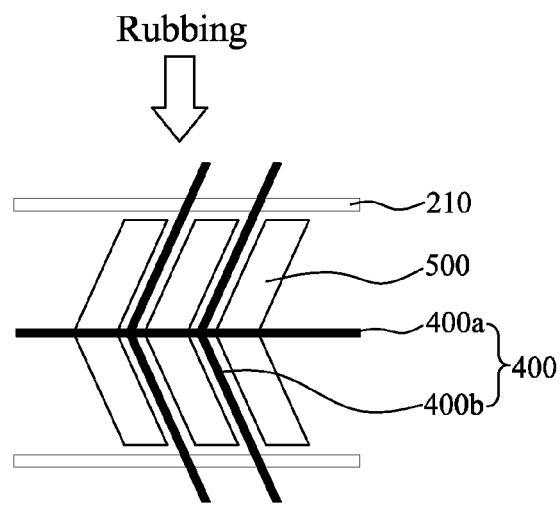
FIGS. 3A to 3C are schematic views illustrating an alignment defect for a rubbing process by a first light-shielding line.
Figure 3B:
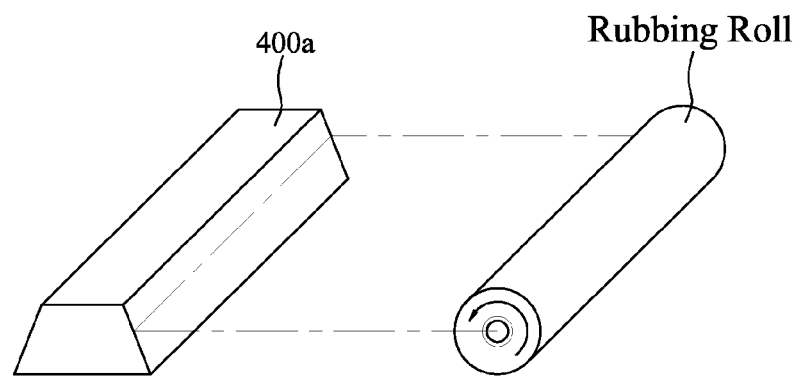
Figure 3C:
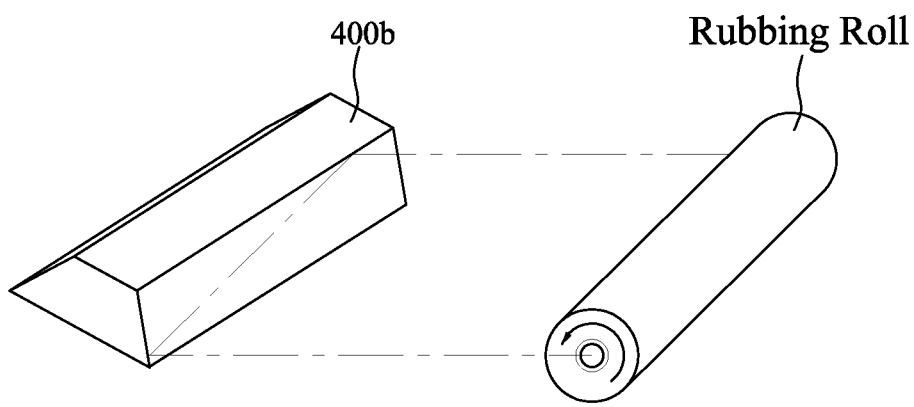

FIGS. 3A to 3C are schematic views illustrating the alignment defect for the rubbing process by the light-shielding line 400, especially, the first light-shielding line 400a. FIG. 3A is a plane view illustrating some pixel regions, and FIGS. 3B and 3C are perspective views illustrating a rubbing roll passing through the light-shielding line 400a, 400b.

As shown in FIG. 3A, the pixel electrode 500 is formed in the bent shape, and the first light-shielding line 400a is formed while intersecting the bent portion of the pixel electrode 500. Also, the second light-shielding line 400b is formed between each of the pixel electrodes 500 while being overlapped with the above data line (See '230' of FIG. 2A).

At this time, the rubbing process for the alignment film proceeds in the direction perpendicular to the first light-shielding line 400a. That is, the rubbing roll moves in the direction being perpendicular to the first light-shielding line 400a and being not perpendicular to the second light-shielding line 400b. In this reason, the rubbing process using the rubbing roll is smoothly carried out in the area of the second light-shielding line 400b, but the rubbing process using the rubbing roll might be not smooth in the area of the first light-shielding line 400a.

In more detail, as shown in FIG. 3B, the rubbing roll moves in the direction being perpendicular to a longitudinal direction of the first light-shielding line 400a, whereby the rubbing process might be not smooth in the area of the first light-shielding line 400a due to the step difference by the first light-shielding line 400a. In this case, an alignment direction of the alignment film is disturbed so that the liquid crystal is not driven in the desired direction, whereby the light leakage might occur.

As shown in FIG. 3C, the rubbing roll moves in the direction being not perpendicular to a longitudinal direction of the second light-shielding line 400b. That is, since the rubbing roll moves slantways along the second light-shielding line 400b, the rubbing process using the rubbing roll is less affected by the step difference of the second light-shielding line 400b, whereby the rubbing process is smoothly carried out in the area of the second light-shielding line 400b. Thus, there is less possibility that the light leakage occurs in the area of the second light-shielding line 400b.

The light leakage may occur in the area of the first light-shielding line 400a which is formed in perpendicular to the light-shielding line 400, and more particularly, to the moving direction of the rubbing roll. In order to overcome this problem, the first light-shielding line 400a is designed in such a manner that it is not perpendicular to the moving direction of the rubbing roll, that is, the rubbing direction.

FIGS. 4A to 4J are plane views illustrating various embodiments of first light-shielding line designed not to be perpendicular to the rubbing direction, which are provided to minimize the light leakage in the area of the first light-shielding line 400a

Figure 4A:
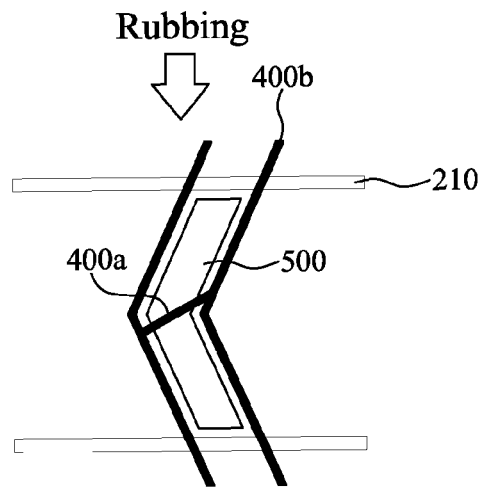
FIGS. 4A to 4J are plane views illustrating various embodiments of first light-shielding line which is not perpendicular to a rubbing direction.
Figure 4B:
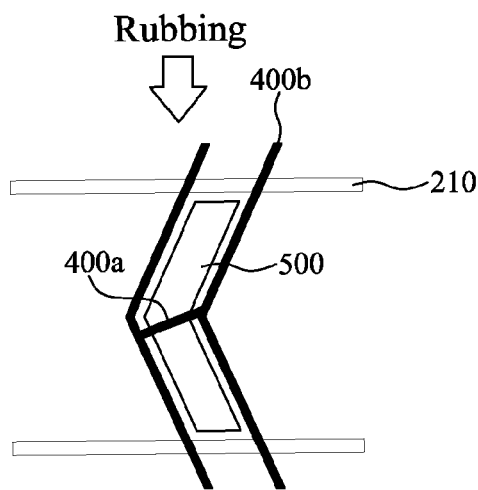
Figure 4C:
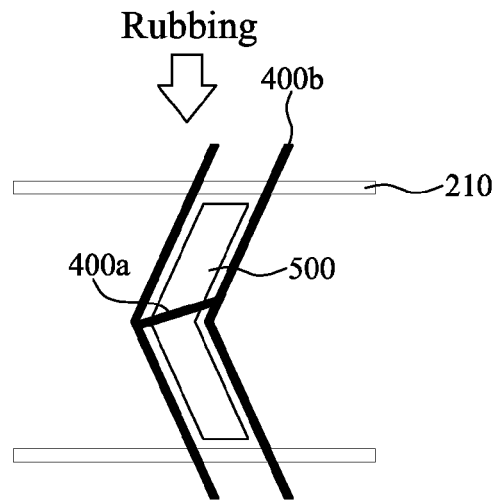

FIGS. 4A to 4C illustrate that the first light-shielding line 400a slants in a direction from a lower left side toward an upper right side while being not parallel to the gate line 210. Particularly, FIG. 4A illustrates the first light-shielding line 400a is formed slantways in such a manner that both ends of the first light-shielding line 400a do not meet with the bent portion of the second light-shielding line 400b. FIGS. 4B and 4C illustrate that the first light-shielding line 400a is formed slantways in such a manner that one end of the first light-shielding line 400a meets with the bent portion of the second light-shielding line 400b.

Figure 4D:
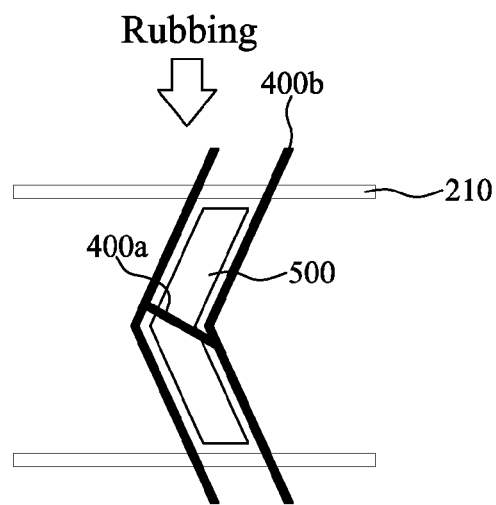
Figure 4E:
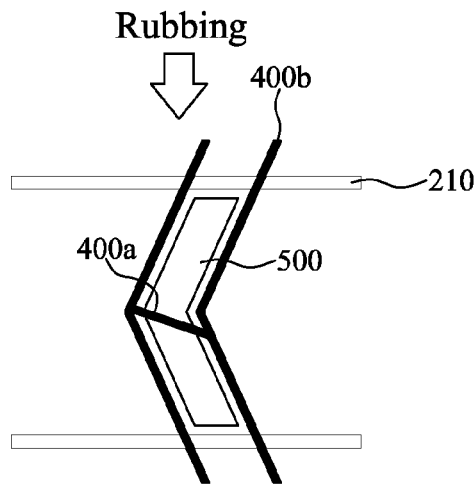
Figure 4F:
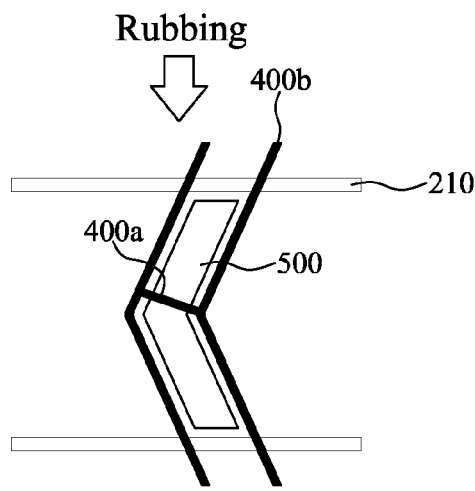

FIGS. 4D to 4F illustrate that the first light-shielding line 400a slants in a direction from an upper left side toward a lower right side while being not parallel to the gate line 210. Particularly, FIG. 4D illustrates the first light-shielding line 400a is formed slantways in such a manner that both ends of the first light-shielding line 400a do not meet with the bent portion of the second light-shielding line 400b. FIGS. 4E and 4F illustrate that the first light-shielding line 400a is formed slantways in such a manner that one end of the first light-shielding line 400a meets with the bent portion of the second light-shielding line 400b.

Figure 4G:
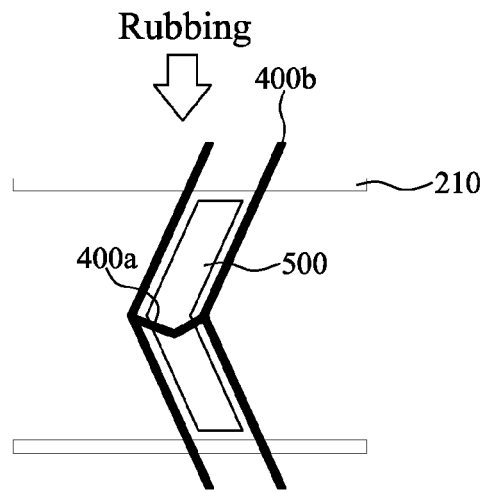
Figure 4H:
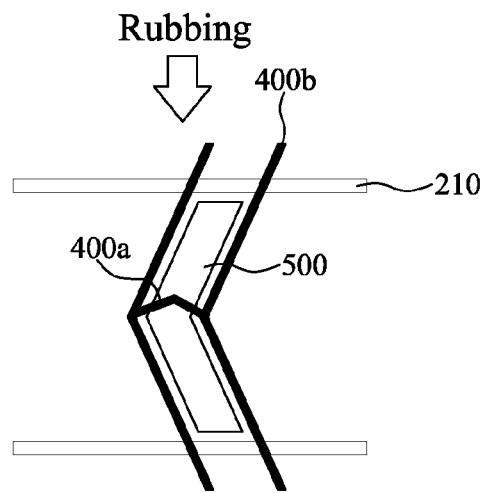

FIGS. 4G and 4H illustrate that the first light-shielding line 400a is formed in a bent structure while being not parallel to the gate line 210. Particularly, FIG. 4G illustrates that the first light-shielding line 400a is bent downward (that is, in shape of 'V'), and FIG. 4H illustrates that the first light-shielding line 400a is bent upward (that is, in shape of 'Λ').

Figure 4I:
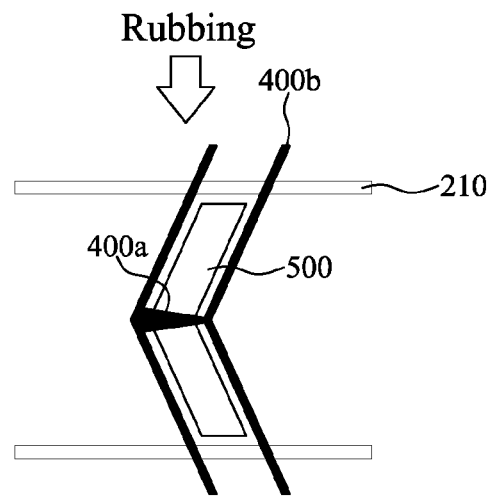
Figure 4J:
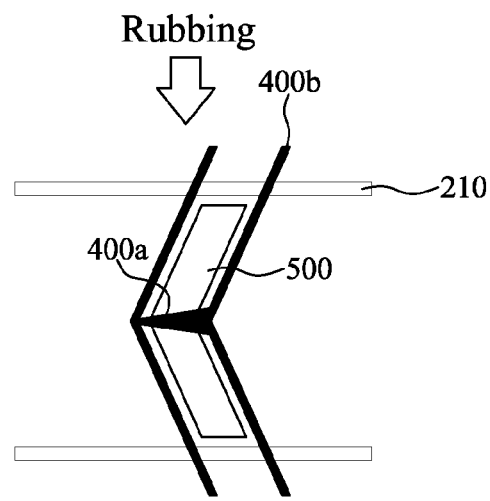

FIGS. 4I and 4J illustrate that the first light-shielding line 400a is formed in such a manner that a width of the first light-shielding line 400a is gradually increased or decreased while being not perpendicular to the rubbing direction.

FIGS. 4A to 4J illustrate the various shapes of the first light-shielding line 400a designed to be not perpendicular to the rubbing direction, however, the shapes of the first light-shielding line 400a are not limited to the shapes described above.

Figure 5A:
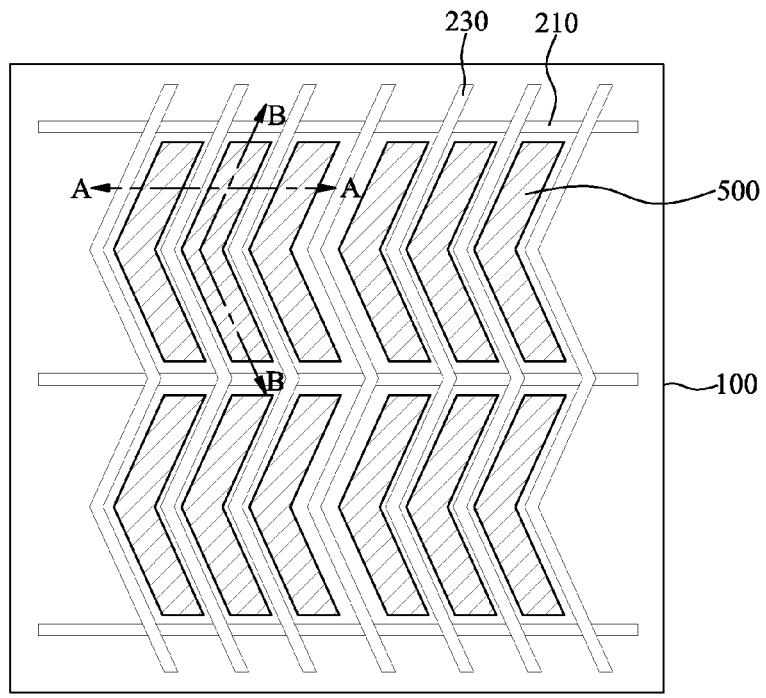
FIGS. 5A and 5B are plane views illustrating a lower substrate of an LCD device according to another embodiment of the present invention.
Figure 5B:
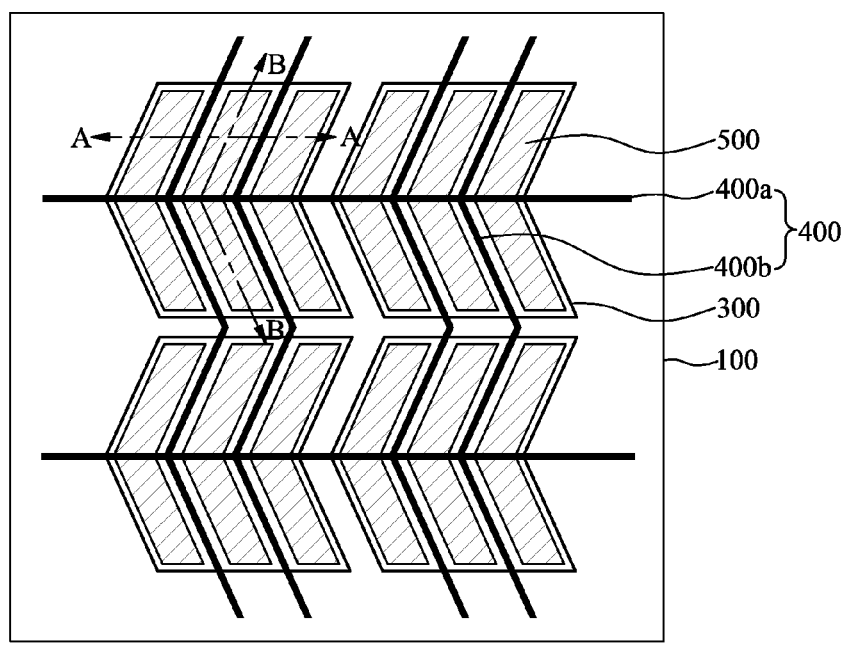
Figure 5C:
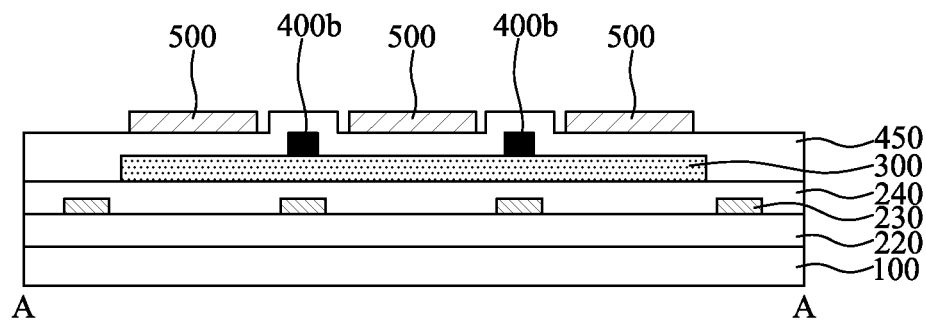
FIG. 5C is a cross section view along A-A of FIGS. 5A and 5B.
Figure 5D:
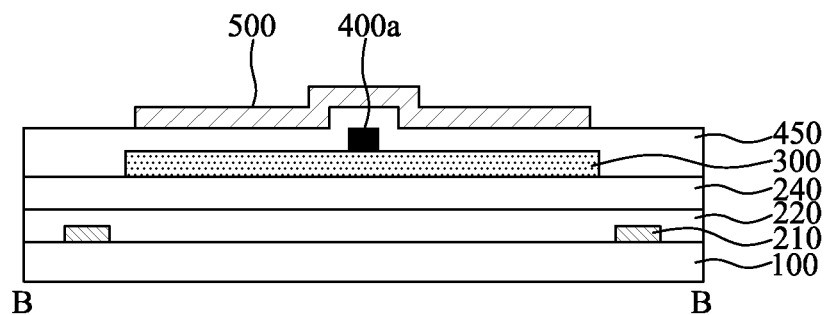
FIG. 5D is a cross section view along B-B of FIGS. 5A and 5B.

FIGS. 5A and 5B are plane views illustrating a lower substrate of an LCD device according to another embodiment of the present invention, FIG. 5C is a cross section view along A-A of FIGS. 5A and 5B, and FIG. 5D is a cross section view along B-B of FIGS. 5A and 5B. FIGS. 5A to 5D illustrate only main structures of the present invention without showing a detailed structure of other elements except main elements.

FIGS. 5A and 5B are provided to precisely show each of main elements by simplifying a complex structure. FIG. 5A illustrates only gate line 210, data line 230, and pixel electrode 500. FIG. 5B illustrates only common electrode 300, light-shielding line 400, and pixel electrode 500. Thus, on the lower substrate of the LCD device according to another embodiment of the present invention, there are the gate line 210, the data line 230, the common electrode 300, the light-shielding line 400, and the pixel electrode 500.

Except a change of a pattern structure in the common electrode 300, the lower substrate of the LCD device shown in FIGS. 5A to 5D is similar in structure to the above lower substrate of the LCD device shown in FIGS. 2A to 2C.

As shown in FIG. 5A, according to the LCD device according to another embodiment of the present invention, a pixel region is defined by the gate line 210 and the data line 230 intersecting each other on a substrate 100, and the pixel electrode 500 is formed in the pixel region. The gate line 210, the data line 230, and the pixel electrode 500 are the same as those of the above embodiment of the present invention, whereby a detailed explanation for the gate line 210, the data line 230, and the pixel electrode 500 will be omitted.

As shown in FIG. 5B, the common electrode 300 is formed on the substrate 100. The common electrode 300 together with the pixel electrode 500 generates an electric field so as to drive liquid crystal, and also the common electrode 300 functions as a sensing electrode for sensing a user's touch.

Typically, a mouse or keyboard is used as an input means for the LCD device. However, when the LCD device is applied to navigations, mobile terminals, and electric appliances, a touch screen is recently used as a new input means instead of using the mouse or keyboard, wherein the touch screen enables a user to directly input information by the use of finger or pen. Furthermore, in order to satisfy user's request for slimness, an LCD device with built-in touch screen has been researched and studied. In the LCD device with built-in touch screen, the common electrode 300 may be utilized as the sensing electrode. That is, if applying the lower substrate of the LCD device according to another embodiment of the present invention shown in FIGS. 5A to 5D, it is possible to realize the LCD device with built-in touch screen.

In order to use the common electrode 300 as the sensing electrode, instead of forming the common electrode 300 on the entire area of the substrate 100 as shown in the above embodiment of the present invention, the plurality of common electrodes 300 may be formed as patterns on the substrate 100. Each of the plurality of common electrodes 300 may be formed in the size corresponding to one or more pixel regions. For example, as shown in the drawings, each common electrode 300 has the size corresponding to the three pixel regions.

The plurality of common electrodes 300 formed individually are connected with the light-shielding line 400 of the conductive line, and a sensing circuit for sensing a touch point is connected with an end of the light-shielding line 400. That is, the light-shielding line 400 of the conductive line functions as the sensing line.

The light-shielding line 400 includes a first light-shielding line 400a and a second light-shielding line 400b, wherein the first light-shielding line 400a is formed in the interfacial portion between the divided domains, that is, the bent portion of the pixel electrode 500; and the second light-shielding line 400b overlaps with the data line 230.

The first light-shielding line 400a may be parallel to the gate line 210. However, the first light-shielding line 400a is not perpendicular to the rubbing direction so as to minimize the light leakage by the smooth rubbing process, that is, the first light-shielding line 400a may be patterned in various shapes shown in FIGS. 4A to 4J.

Preferably, a width of the second light-shielding line 400b is not larger than a width of the data line 230 so as to prevent the decrease in light transmittance. The second light-shielding line 400b may overlap with entire portions of the data line 230.

A cross section structure of the LCD device according to another embodiment of the present invention will be described with reference to FIGS. 5C and 5D. As shown in FIG. 5C, a gate insulating film 220 is formed on the substrate 100, and the data lines 230 are formed at fixed intervals on the gate insulating film 220. Then, a passivation film 240 is formed on the data line 230, and the common electrode 300 is patterned on the passivation film 240. On the common electrode 300, there is the light-shielding line, and more particularly, the second light-shielding line 400b. Then, an insulating film 450 is formed on the second light-shielding line 400b, and the pixel electrode 500 is formed on the insulating film 450. Especially, the second light-shielding line 400b overlaps with the data line 230.

As shown in FIG. 5D, the gate lines 210 are formed at fixed intervals on the substrate 100. On the gate line 210, there is the gate insulating film 220. Then, the passivation film 240 is formed on the gate insulating film 220, and the common electrode 300 is patterned on the passivation film 240. The light-shielding line, and more particularly, the first light-shielding line 400a is formed on the common electrode 300, and the insulating film 450 is formed on the first light-shielding line 400a. Then, the pixel electrode 500 is formed on the insulating film 450.

The light-shielding line 400a, 400b may directly contact with the common electrode 300 while being positioned on a lower surface of the common electrode 300.

For the above embodiments of the present invention, the common electrode 300 and the pixel electrode 500 are provided with the insulating film 450 interposed therebetween, wherein the common electrode 300 is positioned under the insulating film 450, and the pixel electrode 500 is positioned over the insulating film 450. However, it is not limited to this structure. For example, the present invention may include the structure where the common electrode 300 is positioned over the insulating film 450, and the pixel electrode 500 is positioned under the insulating film 450.

Also, the present invention may include the structure where the common electrode 300 is formed in a finger shape including a slit, and the pixel electrode 500 is formed in a plate shape.

Also, the present invention is not limited to the fringe field switching mode LCD device. In addition to the fringe filed switching mode LCD device, the present invention may be applied to various modes of LCD device within the scope of technical idea of the present invention.

The above explanation relates with the detailed structure of the lower substrate in the LCD device according to the present invention. The LCD device according to the present invention includes the aforementioned lower substrate, an upper substrate, and a liquid crystal layer formed between the lower and upper substrates. On the upper substrate, there may be black matrix which prevents light from leaking in other regions except the pixel region; red (R), green (G), and blue (B) color filter layers which are formed between each of the black matrix; and an overcoat layer which is formed on the color filter layers.

According to the LCD device of the present invention, the light-shielding line 400 is formed in the disclination-occurring portion of the pixel region, that is, the portion along the interface between the divided domains in the pixel region, thereby preventing the light leakage.

Also, the light-shielding line 400 is formed of the conductive line, and is connected with the common electrode 300, thereby resulting in the reduced resistance of the common electrode 300.

Also, the common electrode 300 is used as the sensing electrode, and the light-shielding line 400 of the conductive line is used as the sensing line, thereby realizing the LCD device with built-in touch screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
    plurality of gate and data lines which are formed on a substrate while intersecting each other to define a pixel region;
    a pixel electrode which is formed in the pixel region, and is divided into at least two domains;
    a common electrode which is patterned to generate an electric field together with the pixel electrode; and a light-shielding line having a first light-shielding line which is formed in an interfacial portion between the domains so as to prevent light leakage therethrough, wherein the light-shielding line is formed on the substrate, and wherein the pixel electrode is formed in a bent shape, and the first light-shielding line is formed of a line connecting the bent portions of the pixel electrode, wherein the first light-shielding line is formed between the gate lines, wherein the pixel electrode and the common electrode are formed on the substrate, wherein the light-shielding line is formed of a conductive line connected with the common electrode, and wherein the conductive line is a sensing line, and the common electrode is formed of a plurality of predetermined patterns to function as a sensing electrode.

2. The LCD device according to claim 1, wherein the gate line is formed in a straight line, and the data line is formed in a line shape with bent portions.

3. The LCD device according to claim 1, wherein the first light-shielding line is parallel to the gate line.

4. The LCD device according to claim 1, wherein the first light-shielding line is not to perpendicular to a rubbing direction.

5. The LCD device according to claim 4, wherein the first light-shielding line is not parallel to the gate line.

6. The LCD device according to claim 4, wherein the first light-shielding line is gradually increased or decreased in width.

7. The LCD device according to claim 1, wherein the light-shielding line includes a second light-shielding line overlapping with the data line.

8. The LCD device according to claim 7, wherein a width of the second light-shielding line is not larger than a width of the data line.

9. The LCD device according to claim 1, wherein the common electrode and the pixel electrode are provided with an insulating film interposed therebetween.

10. The LCD device according to claim 1, wherein one of the common electrode and the pixel electrode is formed in a finger shape, and the other of the common electrode and the pixel electrode is formed in a plate shape.

* * * * *